(12) United States Patent
Agiwal et al.

(10) Patent No.: US 9,173,138 B2
(45) Date of Patent: Oct. 27, 2015

(54) METHOD FOR HANDOFF DURING CONNECTED MODE OF A MULTIMODE MOBILE STATION IN MIXED DEPLOYMENT

(75) Inventors: Anil Agiwal, Bangalore (IN); Arishuman Nigam, Bangalore (IN); Tirumala Sree Hari Vara Prasad Vadlapudi, Bangalore (IN)

(73) Assignee: Samsung Electronics, Co., Ltd., Suwon-Si (KR)

( * ) Notice: Subject to any disclaimer, the term of this patent is extended or adjusted under 35 U.S.C. 154(b) by 477 days.

(21) Appl. No.: 12/459,723

(22) Filed: Jul. 7, 2009

(65) Prior Publication Data

US 2010/0002653 A1    Jan. 7, 2010

(30) Foreign Application Priority Data

Jul. 7, 2008  (IN) .......................... 1656/CHE/2008

(51) Int. Cl.
*H04W 36/00* (2009.01)
*H04W 4/00* (2009.01)
*H04W 36/14* (2009.01)

(52) U.S. Cl.
CPC .......... *H04W 36/0061* (2013.01); *H04W 36/14* (2013.01)

(58) Field of Classification Search
USPC ......... 370/330–342, 328, 352, 267, 503, 318; 455/41.2, 63.1, 434, 450, 509, 501, 455/422.1, 432.1, 461.1–461.5, 436, 418, 455/458, 437, 343.2, 438
See application file for complete search history.

(56) References Cited

U.S. PATENT DOCUMENTS 7,551,586 B1 *  6/2009  Yew et al. ...................... 370/332
7,889,737 B2 *  2/2011  Kangude et al. .............. 370/392
(Continued)

FOREIGN PATENT DOCUMENTS

KR    1020060109300 A    10/2006
KR    1020060110430 A    10/2006
(Continued)

OTHER PUBLICATIONS

International Search Report dated Jan. 29, 2010 in connection with PCT Application No. PCT/KR2009/003707.
(Continued)

*Primary Examiner* — Kent Chang
*Assistant Examiner* — William Lu

(57) ABSTRACT

Methods for handoff of a multimode mobile station (MS). The MS, in connected mode, moves from a cell of a legacy base station to a cell of an ABS and scans base stations from a list of neighboring base stations, wherein at least the ABS is listed as another legacy base station in the list of neighboring base stations. The MS performs the handoff to connect to a legacy zone of the ABS. Further, the multimode MS switching from the legacy zone of the ABS to a advanced zone of the ABS based on a Zone Switch request or command is triggered by either the multimode MS or the ABS. The Zone Switch request is triggered after detecting capabilities of either the multimode MS or the ABS that they support advanced zone. The capabilities are detected by using MAC versions of the multimode MS and the ABS or an indicator for the advanced zone. The multimode MS can also performs handoff to the advanced zone from the cell of the legacy base station by receiving one or more information for ranging in the advanced zone from the ABS during the handoff.

55 Claims, 6 Drawing Sheets

(56) References Cited

U.S. PATENT DOCUMENTS

| | | | |
|---|---|---|---|
| 7,917,121 B2* | 3/2011 | Kim et al. | 455/343.2 |
| 8,301,148 B2* | 10/2012 | Yang et al. | 455/438 |
| 8,446,878 B2* | 5/2013 | Jung et al. | 370/331 |
| 2002/0051432 A1 | 5/2002 | Shin | |
| 2002/0122396 A1* | 9/2002 | Terasawa | 370/331 |
| 2002/0147030 A1* | 10/2002 | Chun et al. | 455/561 |
| 2004/0023665 A1* | 2/2004 | Simmonds et al. | 455/456.1 |
| 2004/0259549 A1* | 12/2004 | Ejzak et al. | 455/439 |
| 2005/0170776 A1* | 8/2005 | Siorpaes | 455/41.2 |
| 2005/0180360 A1* | 8/2005 | Hansen et al. | 370/334 |
| 2006/0009187 A1* | 1/2006 | Sheynman et al. | 455/318 |
| 2006/0109817 A1* | 5/2006 | Ramanna et al. | 370/331 |
| 2006/0187882 A1 | 8/2006 | Kwak et al. | |
| 2006/0240832 A1* | 10/2006 | Kim et al. | 455/438 |
| 2007/0021119 A1* | 1/2007 | Lee et al. | 455/436 |
| 2007/0021120 A1* | 1/2007 | Flore et al. | 455/436 |
| 2007/0213059 A1* | 9/2007 | Shaheen | 455/436 |
| 2008/0095195 A1* | 4/2008 | Ahmadi et al. | 370/478 |
| 2008/0220788 A1* | 9/2008 | Stanwood et al. | 455/450 |
| 2008/0220791 A1* | 9/2008 | Cho et al. | 455/450 |
| 2008/0254782 A1* | 10/2008 | Nakamata et al. | 455/418 |
| 2008/0267128 A1* | 10/2008 | Bennett et al. | 370/331 |
| 2008/0293419 A1* | 11/2008 | Somasundaram et al. | 455/437 |
| 2008/0311913 A1* | 12/2008 | Thiebaut et al. | 455/436 |
| 2009/0016268 A1* | 1/2009 | Yi et al. | 370/328 |
| 2009/0092085 A1* | 4/2009 | Ramesh et al. | 370/329 |
| 2009/0111473 A1* | 4/2009 | Tao et al. | 455/440 |
| 2009/0168745 A1* | 7/2009 | Ahmadi et al. | 370/350 |
| 2009/0176513 A1* | 7/2009 | Bosch et al. | 455/458 |
| 2009/0207804 A1* | 8/2009 | Chou et al. | 370/331 |
| 2009/0227255 A1* | 9/2009 | Thakare | 455/434 |
| 2010/0002653 A1* | 1/2010 | Agiwal et al. | 370/331 |
| 2010/0135205 A1* | 6/2010 | Li et al. | 370/328 |
| 2011/0019622 A1* | 1/2011 | Lee et al. | 370/328 |
| 2011/0090879 A1* | 4/2011 | Hamiti et al. | 370/338 |
| 2011/0116480 A1* | 5/2011 | Li et al. | 370/332 |

FOREIGN PATENT DOCUMENTS

| | | |
|---|---|---|
| KR | 100724992 B1 | 5/2007 |
| WO | WO 93/06683 | 4/1993 |
| WO | WO 2006/107701 A2 | 10/2006 |

OTHER PUBLICATIONS

Notice of Patent Grant dated Apr. 23, 2013 in connection with Japanese Application No. 2011-517344, 4 pages.

Yung-Han Chen, et al., "Handover Issues in IEEE 802.16m/e Co-existing Systems", C802.16m-08/586, Jul. 7, 2008, 10 pages.

Haihong Zheng, et al., "Intra-RAT Mobility Support in 802.16m", IEEE C802.16m-08/646r1, Jul. 11, 2008, 20 pages.

Zexian Li, et al., "Mobility-Network Entry in 802.16m", IEEE C802.16m-08/760r2, Jul. 7, 2008, 11 pages.

Zexian Li, et al., "TDD Frame Structure With Legacy Support", IEEE C802.16m-07/215r1, 2 215rl, Jan. 16, 2008, 7 pages.

Extended European Search Report dated Oct. 18, 2013 in connection with European Patent application No. 09164789.1; 9 pages.

Li, et al.; "802.16m solution to the legacy support"; Nokia Corporation; IP. Com Journal; Feb. 6, 2008; XP013123757; 8 pages.

European Examination Report dated Jul. 15, 2014 in connection with European Patent application No. 09164789.1; 8 pages.

Notice of Preliminary Rejection dated Jun. 3, 2015 in connection with Korean Application No. 10-2009-0061533; 13 pages.

\* cited by examiner

METHOD FOR HANDOFF DURING CONNECTED MODE OF A MULTIMODE MOBILE STATION IN MIXED DEPLOYMENT

CROSS-REFERENCE TO RELATED APPLICATION(S) AND CLAIM OF PRIORITY

This patent application claims priority from the Indian provisional patent application number 1656/CHE/2008, filed on Jul. 7, 2008 entitled "A SYSTEM AND METHOD OF EFFICIENT CONNECTED MODE OPERATION IN A MIXED DEPLOYMENT" and assigned to Samsung India Software Operations Private Limited, which is hereby incorporated in its entirety.

TECHNICAL FIELD OF THE INVENTION

The present invention relates to Mobile Broadband Wireless Access system and their evolved revisions, and more particularly, to handoff in the Mobile Broadband Wireless Access system and in their evolved revisions.

BACKGROUND OF THE INVENTION

Continuously emerging user needs have contributed to the rapid development of various 'Mobile Broadband Wireless Access' (herein after 'MBWA') technologies. As the demand for high speed data services increases while a user is on move, many MBWA technologies are being upgraded to cater to this demand. For example, one of the early MBWA technologies based on IEEE 802.16e standard, which is widely known as Mobile-WiMax, is being upgraded based on IEEE 802.16m standard. The 'Base Station's (herein after 'BS') in the upgraded or enhanced network are known as 'Advanced Base Station's (herein after 'ABS') that supports both the IEEE 802.16e standard and the IEEE 802.16m standard. The ABS thus enables smooth functioning of a legacy (that is, IEEE 802.16e standard compliant) Mobile Station (MS), a multimode (that is, IEEE 802.16e/16m standard compliant) MS, and an IEEE 802.16m standard compliant MS in these networks.

The multimode MS, when in connected mode, may move across the cells/sectors of the enhanced network that may be based on different revisions of the MBWA standard. As per the existing standard, when a multimode MS in connected mode moves from the cell of a legacy network to the cell of an enhanced network, the connection gets disrupted during the transition. Also when a multimode MS, either in idle mode or in connected mode, attempts to move from the cell of a legacy network to an enhanced network, the MS wastes considerable amount of power in scanning, which is necessary for the MS to find the legacy zone under the ABS of the potential target cell in its neighbourhood to get connected to the ABS of the target cell of the enhanced network.

Further, as per existing state of art, though the multimode MS in connected mode moves from the cell of a legacy network to the cell of an enhanced network, the multimode MS is unable to utilize the additional features of the enhanced network. After the handoff, the multimode MS connects to the legacy zone of the ABS and continues its data service with the ABS using the 802.16e (hereinafter '16e') protocols of the legacy network as specified in IEEE 802.16e standard. Such a system, limits the utility of a multimode MS in the enhanced network despite the system's capability.

Thus a scope is identified to improve the handoff functioning of a multimode MS in an MBWA standard compliant communication system when the multimode MS, in connected mode, is moving from a cell of a legacy network to the cell of an enhanced network. Further, another scope is identified to improve the functioning of a multimode MS after the handoff when the MS has moved from the cell of a legacy network to the cell of an enhanced network.

SUMMARY OF THE INVENTION

To address the above-discussed deficiencies of the prior art, it is a primary object to provide, methods that eliminate, or at least significantly alleviate, the limitations and drawbacks of the prior art, including those described herein above. Accordingly, a method for handoff of a multimode mobile station when the multimode mobile station, in connected mode, is moving from a cell of a legacy base station to a neighbouring cell of an advanced base station, wherein the ABS is having a legacy zone and a 802.16m (hereinafter also '16m') zone is provided. Accordingly, the method comprises scanning, by the multimode mobile station, a plurality of base stations from a list of neighbouring base stations, wherein the plurality of base stations includes at least the ABS when the ABS is listed as another legacy base station in the list of neighbouring base stations; then performing the handoff from the serving legacy base station to the legacy zone of the ABS.

Additionally, a method for triggering a Zone Switch request by either the multimode mobile station or the ABS for switching the multimode mobile station from the legacy zone of the ABS to the 16m zone of the ABS is provided. Triggering the switching by the multimode mobile station comprises detecting a capability of the ABS that the ABS supports 16m zone, and then transmitting the Zone Switch request to the ABS, based on the capability of the ABS. The capability of the ABS is detected by using either a MAC version of the ABS or an indicator for the 16m zone, wherein the MAC version could be received either from the legacy zone or the legacy base station. The Zone Switch request is transmitted to the ABS by using a ranging request (RNG REQ) message. The multimode mobile station then receives a response to the Zone Switch request from the ABS; and switches to the 16m zone of the ABS from the legacy zone of the ABS if the received response includes information for the switching the zone.

Further, a method for triggering a Zone Switch request by the ABS is provided. Triggering the switching by the ABS comprises detecting a capability of the multimode mobile station that the multimode mobile station supports the 16m zone, and then transmitting a Zone Switch command to the multimode mobile station based on the capability of the multimode mobile station. The capability of the multimode mobile station is detected by using a MAC version of the multimode mobile station. The Zone Switch command includes one or more information for the switching. The multimode mobile station then receives the Zone Switch command from the ABS and switches to the 16m zone of the ABS using the received information.

Another method for handoff of a multimode mobile station when the multimode mobile station, in connected mode, is moving from a cell of a first legacy base station to a neighbouring cell of an advanced base station (ABS), wherein the ABS is having a legacy zone and a 16m zone is provided. The method includes scanning, by the multimode mobile station, a plurality of base stations from a list of neighbouring base stations, wherein the plurality of base stations includes at least the ABS when the ABS is listed as a legacy base station in the list of neighbouring base stations; indicating a capability of the multimode mobile station that the mobile station supports the 16m zone to the first legacy base station, by using a MAC version of the multimode mobile station; performing a network reentry into the legacy zone; detecting a capability of the ABS that the ABS supports 16m zone, by using either a MAC version of the ABS or an indicator for the 16m zone; and switching from the legacy zone to the 16m zone by using one or more information for ranging in the 16m zone, based on the capability of the ABS. The multimode mobile station performs the network reentry into the legacy zone includes transmitting a handoff request to the legacy base station; receiving a response to the handoff request from the legacy base station, wherein the response includes the one or more information for ranging in the 16m zone; and then synchronizing to the legacy zone of the ABS.

Yet another method for handoff of a multimode mobile station when the multimode mobile station, in connected mode, is moving from a cell of a legacy base station to a neighbouring cell of an advanced base station, wherein the ABS is having a legacy zone and a 16m zone is provided. The method includes receiving, by the ABS, a MAC version of the multimode mobile station from the legacy base station, wherein the first MAC version indicates a capability of the multimode mobile station that the multimode mobile station supports the ABS; receiving, a handoff request from the legacy base station; broadcasting, a MAC version of the ABS to the legacy base station and the legacy zone; and then transmitting a response to the handoff request to the legacy base station, wherein the response includes either a ranging resource for ranging of the multimode mobile station in the 16m zone when the ABS detects the first capability of the multimode mobile station, or a ranging resource for ranging in the legacy zone.

Additionally, a method for transmitting a Zone Switch command to the multimode mobile station by the ABS for switching the multimode mobile station from the legacy zone to the 16m zone is provided. The Zone Switch command is transmitted when the multimode mobile station is handoffed to the legacy zone, and the ABS detects the capability of the multimode mobile station. The ABS can also transmit the Zone Switch command to a Zone Switch request when the ABS receives the Zone Switch request from the multimode mobile station.

These methods, features and other advantages of the present invention would become more apparent in the ensuing detailed description of the drawings and embodiments of the present invention, which is further limited by the scope of the claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE ACCOMPANYING DRAWINGS

For a more complete understanding of the present disclosure and its advantages, reference is now made to the following description taken in conjunction with the accompanying drawings, in which like reference numerals represent like parts:

Figure 4:
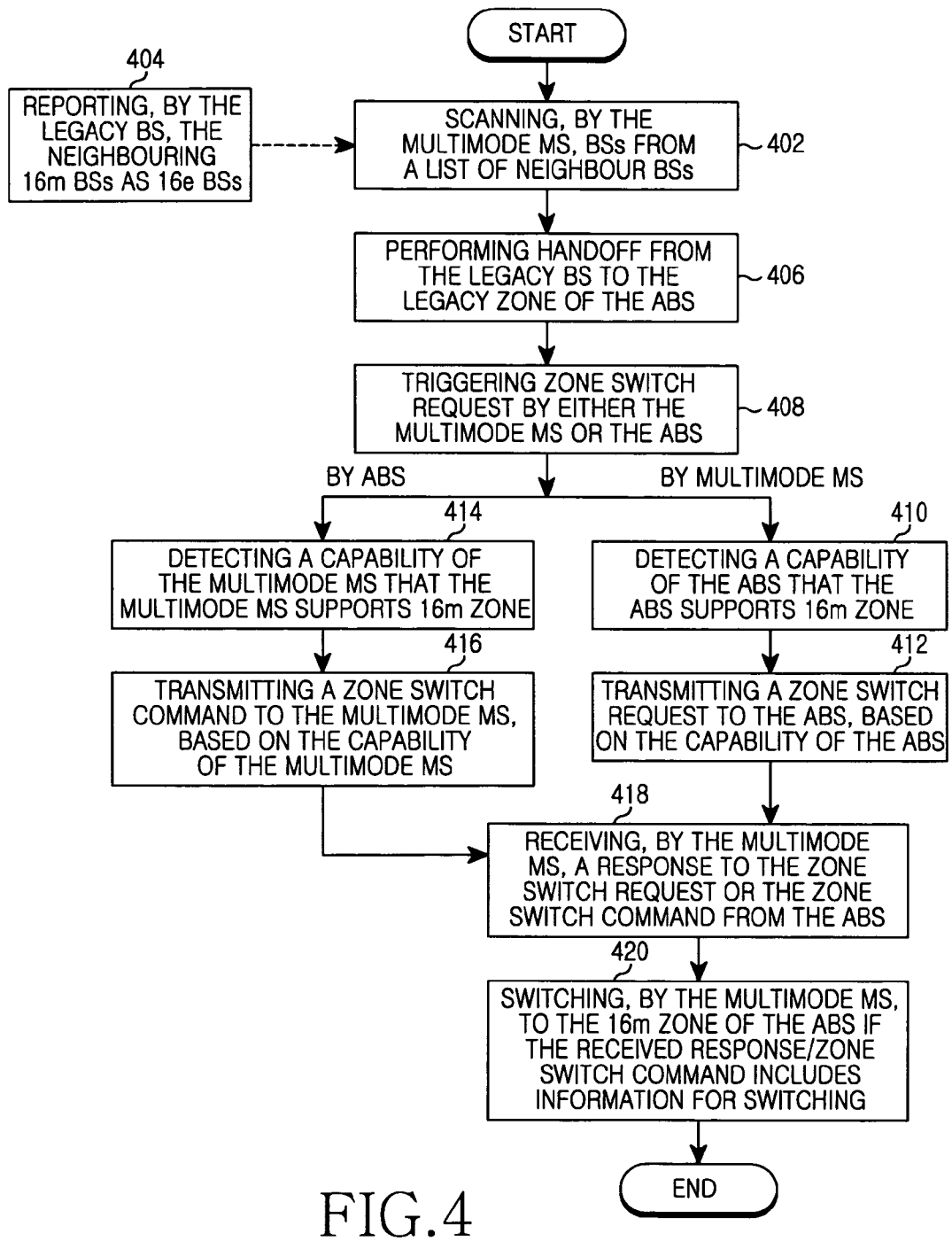
Figure 5:
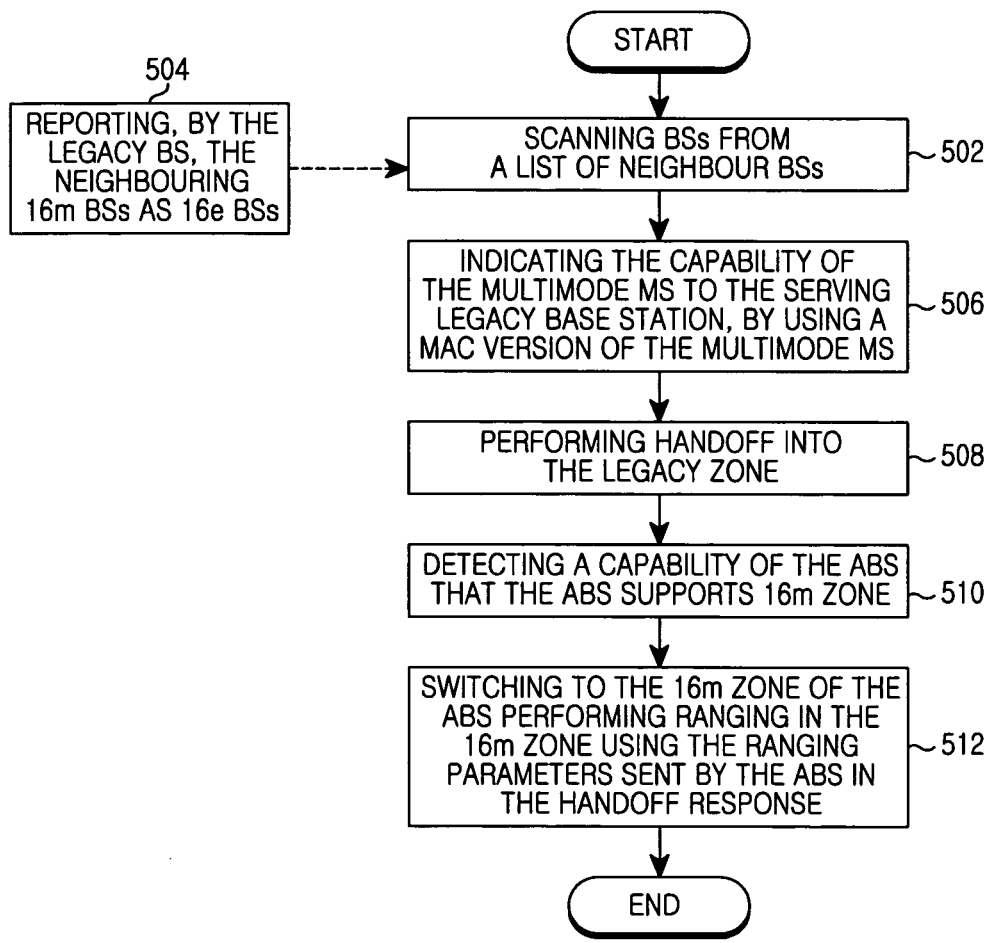

FIG. 4 illustrates a method for handoff in a mixed deployment when the multimode MS, in connected mode, is moving from a cell of a serving legacy BS to a neighbouring cell of an ABS and then switching from the legacy zone to the 16m zone of the ABS according to embodiments of the present disclosure; and FIG. 5 illustrates a method for handoff in a mixed deployment when the multimode MS, in connected mode, is moving from a cell of a serving legacy BS to a neighbouring cell of an ABS and handoffing to the 16m zone of the ABS according to embodiments of the present disclosure.

DETAILED DESCRIPTION OF THE INVENTION

FIGS. 1A through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network. Further, any relational terms and sequence numbers, like first and second and alike, as may have been used in the description for referring to the accompanying drawings are used to distinguish between two entities without necessarily implying any actual relation between the two entities, unless otherwise specified in the description. The reference numbers, as used in this description, are made unique so that whenever and wherever they are quoted in any part of the description they indicate to only one entity of the drawings. Details, as deemed necessary for a proper understanding of the present invention, are produced here so as not to obscure the description. It will be understood that various other modifications and enhancements to the present invention as may be possible without departing from the scope and spirit of the present invention are all included in the scope of the present invention.

In the following description the term 'legacy BS' refers to a BS in a 'WirelessMAN-OFDMA reference system' (also known as a 'legacy system' or a 'legacy network') that is compliant with a subset of the WirelessMAN-OFDMA capabilities specified by IEEE 802.16-2004 and amended by IEEE 802.16e-2005 and IEEE802.16Cor2/D3 standards. The term 'ABS' refers to a BS in a 'WirelessMAN-OFDMA Reference/

Advanced coexisting system' (also known as an 'enhanced system' or an 'enhanced network') that supports the features and functions of the 'WirelessMAN-OFDMA reference system' through a legacy zone and the features and functions defined by IEEE 802.16m standards through a 16m zone (hereinafter 'advanced zone').

Figure 1A:
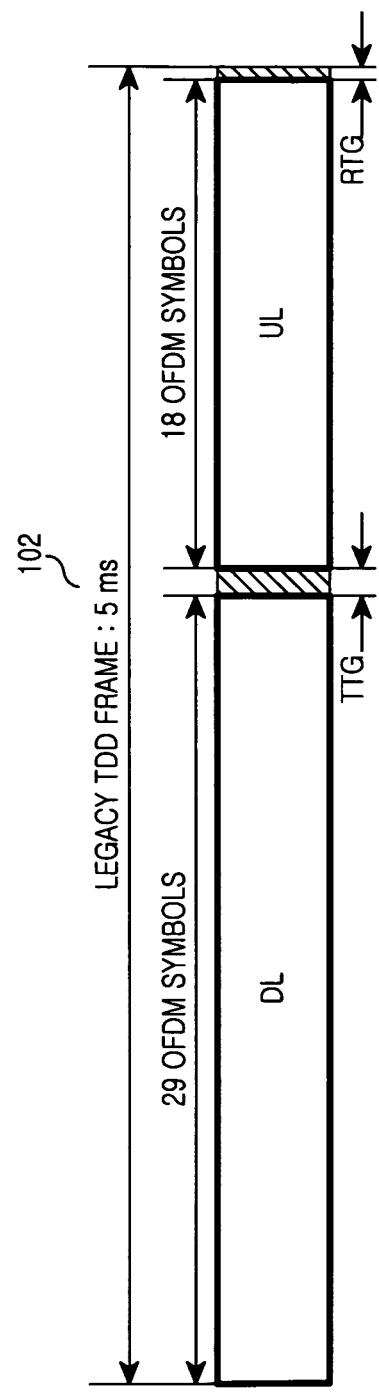
FIGS. 1A and 1B illustrate the IEEE 802.16e frame structure and the IEEE 802.16m frame structure having a DL to UL ratio of 5:3.
Figure 1B:
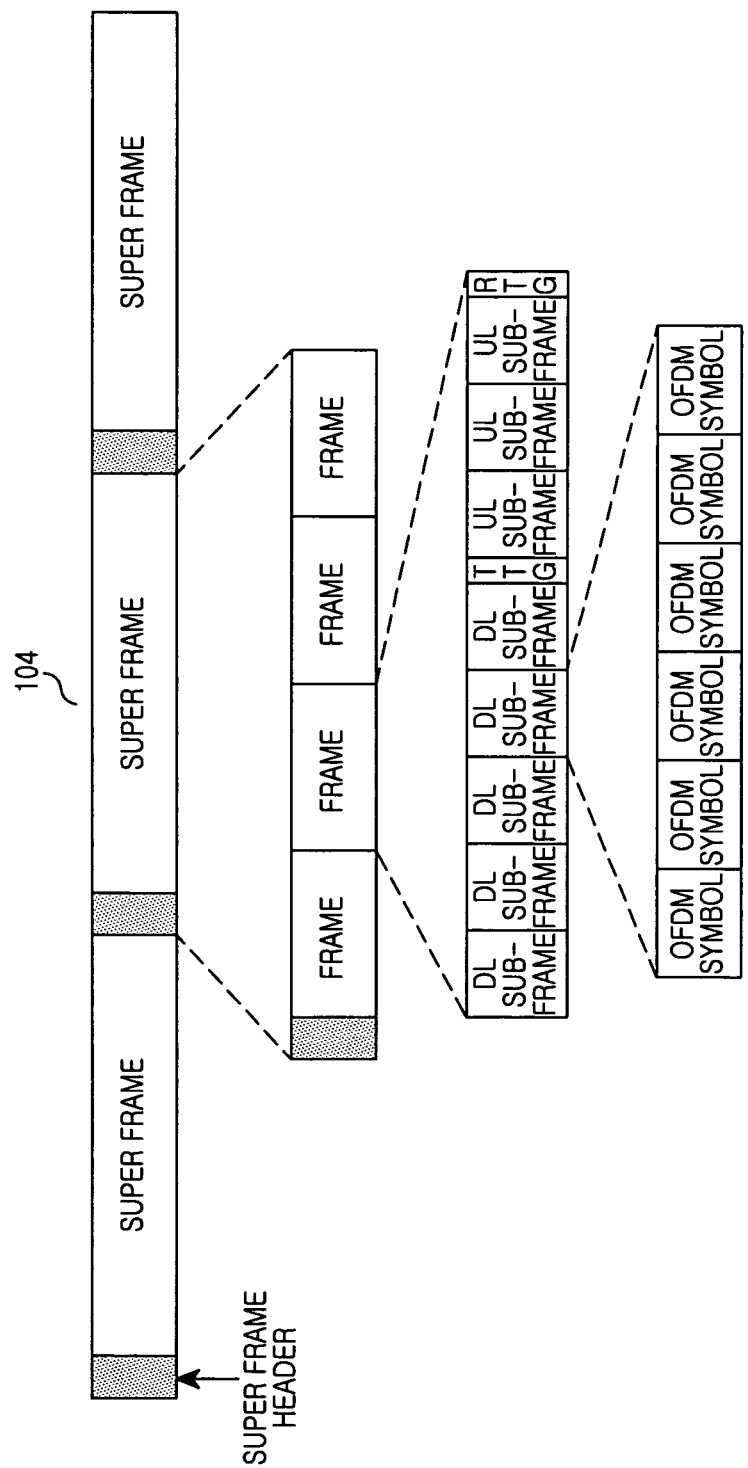
Figure 2:
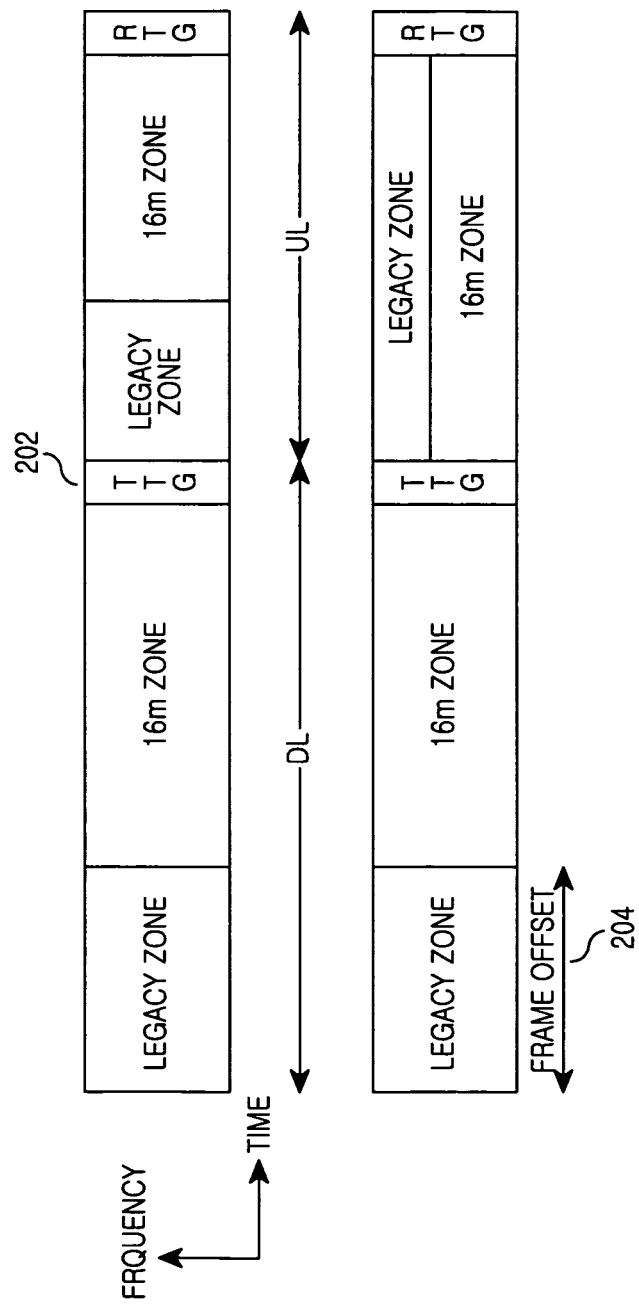
FIG. 2 illustrates the IEEE 802.16m frame structure with zone concept according to embodiments of the present disclosure.

FIGS. 1A and 1B illustrate the IEEE 802.16e frame structure and the IEEE 802.16m frame structure (having a DownLink ('DL') to UpLink ('UL') ratio of 5:3) as per the existing standard. In the IEEE 802.16e standard frame structure, a frame 102 is divided into downlink (DL) and uplink (UL) subframes based on a DL/UL ratio of 5:3. The IEEE 802.16m standard frame structure 104 provides legacy support (IEEE 802.16e standard) as well. A super frame consists of four frames, wherein one single frame consists of eight sub-frames and each sub-frame consists of six OFDM symbols. FIG. 2 illustrates the IEEE 802.16m frame structure 202 with zone concept, wherein the DL and UL portion of the frame is further divided into legacy zone and advanced zone. The division of DL portion of the frame into legacy zone and advanced zone is in time while the division of UL portion of the frame into legacy zone and advanced zone can be in time or in frequency. Under the ABS, IEEE 802.16e standard compliant MSs are supported in the legacy zone wherein the IEEE 802.16m standard compliant MSs are supported in the advanced zone. The sizes of the legacy zone and the advanced zone are not fixed and can vary from frame to frame.

Figure 3:
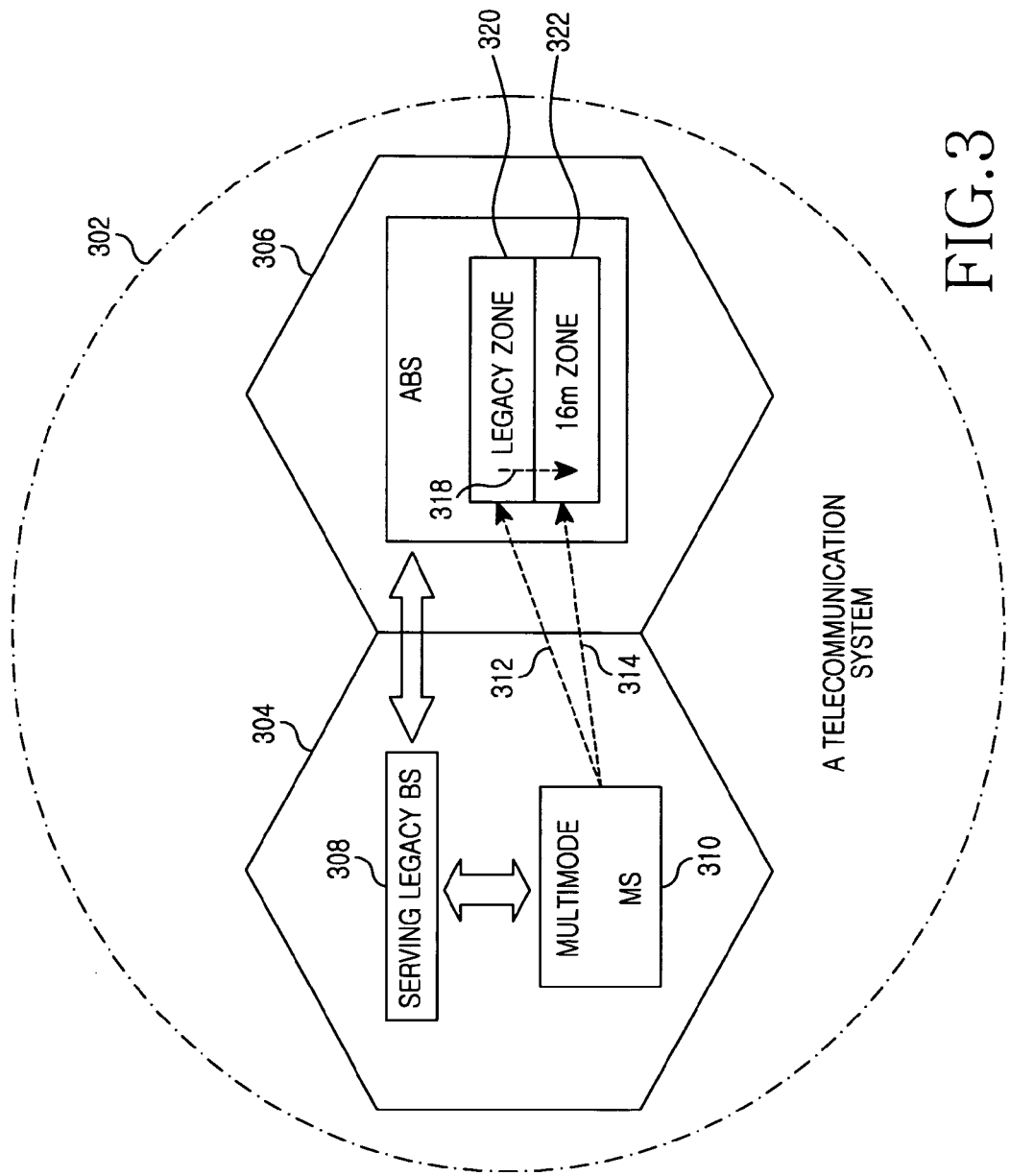
FIG. 3 illustrates telecommunications network including a multimode MS, a serving legacy BS, an ABS, and two neighbouring cells in a mixed deployment of a wireless telecommunication system according to embodiments of the present disclosure.

FIG. 3, in accordance with one embodiment of the present invention, illustrates an exemplary telecommunications network including, but not limited to, a serving legacy BS 308, a multimode MS 310, an ABS 316, and two neighbouring cells 304, 306 in a mixed deployment of a wireless telecommunication system 302, wherein the mixed deployment refers to a setup that is having coexisting neighbouring cells (like 304, 306) supporting either the legacy BS 308 (legacy network) or the ABS 316 (enhanced network). The ABS comprises of a legacy zone 320 and a 16m zone 322. The MBWA system based on IEEE 802.16e/16m standard is used as an example for illustrating the scenario during mobility of a multimode MS in connected mode when the Multimode MS is moving across the MBWA network with cells supporting different revisions of the MBWA standard, to describe the embodiments of the present invention. However the environment may comprise of any other MBWA systems based on other standards and thus falling under the scope of the present invention.

Considering the environment of FIG. 3, as the multimode MS 310, in connected mode, is moving from the cell 304 under the serving legacy BS 308 (i.e., a legacy system) to the cell 306 under the ABS (i.e., an enhanced system), a handoff for the multimode MS 310 is required so that the connection does not get disrupted. The multimode MS 310 being registered with the serving legacy BS 308, communicates with the legacy BS 308 using 16e protocols (as specified in IEEE 802.16e standard), like a 16e MS. Thus a transport connection for data service is established between the multimode MS 310 and the legacy BS 308. The various embodiments of the present invention are described below using the exemplary environment of FIG. 3 as the relevant scenario.

FIG. 4 illustrates, in accordance with one embodiment of the present invention, the method for handoff in the mixed deployment when the multimode MS 310, in connected mode, is moving from the cell 304 of the serving legacy BS 308 to a neighbouring target cell of an enhanced system (here, the neighbouring cell 306 of the ABS 316) and then switching from the legacy zone 320 to the 16m zone 322 of the ABS 316. The multimode MS 310 during mobility periodically scans in step 402 the neighbouring BSs from a 'list of neighbouring BSs' (or 'neighbouring BS list') that is advertised by its serving legacy BS 308. The neighbouring BS list includes the neighbouring BSs and any ABS that may be in the neighbourhood of the serving cell 304 as the serving legacy BS 308 reports in step 404 the neighbouring ABSs as legacy BSs. Thus, in the present example, the neighbouring BS list includes the neighbouring ABS 316 that is listed as a legacy BS. Such an approach mitigates the need for blind scanning by the multimode MS 310 to find a supporting network, such as the legacy zone 320 of the present environment, in the neighbourhood during handoff and thus helps to save considerable amount of power. The multimode MS 310 receives the neighbouring BS list from the serving legacy BS 308 through a broadcast message or a neighbour advertisement message, like the NBR_ADV_MSG. The multimode MS 310, in connected mode, when moving into the cell of 306 under the ABS 316, performs in step 406 handoff using legacy handoff procedure (16e handoff procedure) to connect 312 to the legacy zone 320 of the ABS 316. The above approach thus enables a smooth handoff of the multimode MS 310 to the legacy zone 320 of the ABS 316.

At this stage, however, the multimode MS 310, unaware that the ABS 316 of the neighbouring cell 306 also supports 16m protocols, gets connected to the legacy 320 zone of the ABS 316 after the handoff, despite the capability of the multimode MS 310 to support 16m protocols. Thus the data service between the multimode MS 310 and the ABS 316 at this stage continues to use the 16e protocols of a legacy system. At this juncture, when the multimode MS 310 is still in connected mode, a Zone Switch request to switch the multimode MS 310 to the 16m zone 322 from the legacy zone 320 is triggered in step 408. This Zone Switch request can be triggered in step 408 by either the multimode MS 310 or the ABS 316.

Considering the method, as illustrated by FIG. 4, wherein the Zone Switch request is triggered by the multimode MS 310, the multimode MS 310 first detects in step 410 that the ABS 316 is capable of supporting the 16m protocols. The multimode MS 310 detects in step 410 the capability of the ABS 316 using a Medium Access Control (herein after 'MAC') version of the ABS 316. The MAC version is unique to the type of a BS or an ABS. The multimode MS 310 receives the MAC version of the ABS 316 through a broadcast message from either the legacy zone 320 or the serving legacy BS 308. The multimode MS 310 also receives the MAC version of the ABS 316 through an overhead message from the legacy zone 320 of the ABS 316. The multimode MS 310 also receives the MAC version of the ABS 316 through the neighbour advertisement message (the 'NBR_ADV_MSG') from the serving legacy BS 308 or the legacy zone 320 as the ABS 316 may send its MAC version along with other DL parameters in a broadcast. For example, the ABS 316 sends its MAC Version in DCD parameters or in BCH sub packets. The MAC version of the ABS 316 can be received by the multimode MS 310 prior to the handoff, like in step 402, wherein the multimode MS 310 having the ability to read and decode any message targeted for any 16m compliant MS, decodes the message and detects the ABS's capability using the received MAC version of the ABS. In order to facilitate the detection or identification of the capability of the ABS 316, a MAC version is assigned to the ABS 316 depending on whether:

1. a BS supports only the IEEE 802.16e standard
2. a BS supports only the IEEE 802.16m standard or 3. a BS supports both the IEEE 802.16e and IEEE 802.16m standard. For example, a MAC version of '9' may indicate an ABS supporting both the IEEE802.16e and IEEE802.16m standard.

A unique MAC version relevant to the third criterion is thus assigned to the ABS 316 here. The multimode MS 310 is also capable of detecting in step 410 the capability of the ABS 316 using an indicator for the 16m zone 322. The multimode MS 310 receives the indicator for the 16m zone 322 from the legacy zone 320 through a DL parameter that is broadcasted in FCH, wherein the ABS 316 indicates in the legacy zone 320 that it supports 16m Zone 322 by using the reserved bit in FCH as the 16m zone indicator. The multimode MS 310, upon detecting in step 410 that the ABS 316 also supports the 16m zone 322, transmits in step 412 the Zone Switch request to the ABS 316, or to the legacy zone 320 of the ABS 316. The Zone Switch request is transmitted in step 412 by the multimode MS 310 using a ranging request (or RNG_REQ) message. The Zone Switch request can also be transmitted in step 412 by setting a ranging purpose indicator in the RNG_REQ message to Zone Switch request.

The multimode MS 310 then receives in step 418 a response to the transmitted Zone Switch request from the ABS 316. The multimode MS 310 then switches in step 420 to the 16m zone 322 from the legacy zone 320 depending on whether the received response carries any information for switching the zone. If the target ABS 316 accepts the Zone Switch request received from the multimode MS 310 then the ABS 316 includes information or parameters for switching the zone, like a Zone Switch 'Type Length Value' (herein after 'TLV'), in the response. The ABS 316 may transmit the response using a 'ranging response' (or 'RNG_RSP) message. The multimode MS 310 then switches in step 420 to the 16m zone 322 from the legacy zone 320 using the information or parameters of 16m zone 322 received in the Zone Switch TLV through the RNG_RSP message. The multimode MS 310, in the connected mode, then continues the transport connection for data services with the ABS 316 through its 16m zone 322 using the 16m protocols specified in IEEE 802.16m standard. The multimode MS 310 thus synchronizes to the 16m frame of the target ABS 316 using the parameters received in the Zone Switch TLV. The zone switch TLV may include information like frame offset 204 (as illustrated in FIG. 2) and preamble information of the 16m zone. The frame offset is the offset between the beginning of the legacy frame and the 16m frame and whereas the preamble information is the information that identifies the preambles that are transmitted in the 16m zone 322. The multimode MS 310 then performs network entry into the 16m zone 322.

Considering the method, as illustrated by FIG. 4, wherein the Zone Switch request is triggered by the ABS 316 after the handoff, the ABS 316 first detects in step 414 that the multimode MS 310 is capable of supporting the 16m protocols. The ABS 316 detects in step 414 the capability of the multimode MS 310 by using a MAC version of the multimode MS 310 wherein the ABS 316 receives the MAC version of the multimode MS 310 either from the serving legacy BS 310 through a backhaul network prior to the handoff or from the multimode MS 310 through a signaling message. In order to facilitate the detection or identification of the capability of the multimode MS 310, a MAC version is assigned to the multimode MS 310 depending on whether:

1. the MS supports only the IEEE 802.16e standard
2. the MS supports only the IEEE 802.16m standard or
3. the MS supports both the IEEE 802.16e and IEEE 802.16m standard Therefore, a unique MAC version relevant to the third criterion is assigned to the multimode MS 310 in this example. The ABS 316, upon detecting in step 414 that the multimode MS 310 also supports the 16m zone 322 transmits in step 416 a Zone Switch command to the multimode MS 310. The Zone Switch command is transmitted in step 416 by the ABS 316 using either a command signalling or a 'ranging response' ('RNG_RSP') message. The Zone Switch command carries information or parameters for switching the zone of the multimode MS 310 from the legacy zone 320 to the 16m zone 322. The Zone Switch command may include information like the frame offset 204 (as illustrated in FIG. 2) and the preamble information of the 16m zone. The multimode MS 310 then receives in step 418 the Zone Switch command from the ABS 316. The multimode MS 310 then switches in step 420 to the 16m zone 322 from the legacy zone 320 using the information or parameters received from the ABS 316. The information or parameters for switching may be received through a Zone Switch TLV. The multimode MS 310 then switches in step 420 to the 16m zone 322 from the legacy zone 320 using the information or parameters of 16m zone 322 received in the Zone Switch TLV. The multimode MS 310, in the connected mode, then continues the transport connection for data services with the ABS 316 through its 16m zone 322 using the 16m protocols specified in IEEE 802.16m standard. The multimode MS 310 thus synchronizes to the 16m frame of the target ABS 316 using the parameters received in the Zone Switch TLV. The multimode MS 310 then performs network entry into the 16m zone 322.

FIG. 5 illustrates, in accordance with another embodiment of the present invention, a method for handoff in the mixed deployment when the multimode MS 310, in connected mode, is moving from a cell of a serving legacy BS 308 to a neighbouring cell of an ABS 316 and handoffing to the 16m zone of the ABS. This embodiment provides a method wherein the multimode MS 310 performs the handoff to the 16m zone 322 directly without first handoffing to the legacy zone 320 in neighbouring target cell 306. The multimode MS 310 during mobility periodically scans in step 502 the neighbouring BSs from a 'list of neighbouring BSs' (or 'neighbouring BS list') that is advertised by its serving legacy BS 308. The neighbouring BS list includes the neighbouring BSs and any ABS that may be in the neighbourhood of the serving cell 304 as the serving legacy BS 308 reports in step 504 the neighbouring ABSs as legacy BSs. Thus, in the present example, the neighbouring BS list includes the neighbouring ABS 316, which is listed as a legacy BS. Such an approach mitigates the need for blind scanning by the multimode MS 310 to find a supporting network, such as the legacy zone 320 of the present environment, in the neighbourhood during handoff and thus helps in saving considerable amount of power. The multimode MS 310 receives the neighbouring BS list from the serving legacy BS 308 through a broadcast message or a neighbour advertisement message, like the NBR_ADV_MSG. The multimode MS 310 then indicates in step 506 its capability to support the 16m zone 322 to the serving legacy BS 308. The capability is indicated by using a MAC version of the multimode MS 310. The multimode MS 310 then performs in step 508 the handoff (or network reentry). The method of handoff by the multimode MS 310 begins with first transmitting a handoff request (such as, but not limited to, the MOB_MSHO_REQ or the MOB_SCN_RPT) by the multimode MS 310 to the serving legacy BS 308. The handoff request contains information about the legacy zone 320 of the target BS (e.g., the ABS 316) to which the multimode MS 310 wants to handoff. The serving legacy BS 308 then transmits the handoff request to the ABS 316. The serving legacy BS 308 also transmits the MAC version of the multimode MS 310 over the backhaul network to the ABS 316. The serving legacy BS 308 receives a response to the handoff request from the ABS 316 which is forwarded to the multimode MS 310. The multimode MS 310 thus receives the response to the handoff request from the ABS 316 through the serving legacy BS 308. The multimode MS 310 synchronizes to the legacy zone 320 (or 16e frame) of the target ABS 316 and obtains DL/UL broadcast parameters as broadcasted in the legacy zone 320 of the ABS 316. As the ABS 316 of the target neighbouring cell is able to detect, by using the received MAC version of the multimode MS 310, that the multimode MS 310 requesting for handoff is capable of supporting 16m protocols, the ABS 316 includes information or parameters for ranging (dedicated ranging resource) in the 16m zone 322 in the response (or response message) while transmitting the response to the handoff request to the serving legacy BS 308. Thus the multimode MS 310 receiving the response to its handoff request also receives the information or parameters for ranging in the 16m zone 322. The multimode MS 310 after receiving the response containing information for ranging in the 16m zone can further decide whether to switch to the 16m zone 322 depending on the prevalent network condition. The multimode MS 310 then detects in step 510 the capability of the ABS 316 (or identifies the ABS 316) that the ABS 316 is capable of supporting 16m protocols, by either using the MAC version of the ABS 316 received from the serving legacy BS 308 or using an indicator for the 16m zone 322. The MAC version of the ABS 316 can be received by the multimode MS 310 either through the network broadcast message from the serving legacy BS 308 or through any other appropriate signalling. The multimode MS 310, upon detecting in step 510 the capability of the ABS 316, switches in step 512 to the 16m zone 322 and performs ranging in the 16m zone 322 using the ranging resource received in the response from the serving legacy BS 308 on behalf of the ABS 316.

The described methods, when implemented or practiced, would provide improved user experience as the IEEE 802.16m connection is superior (for example having better QoS compared to that of 16e connection) to 16e connection. Further, the method when implemented would help to manage network resources efficiently as the network will have options to put 16e MSs and 16m MSs in appropriate zones of the enhanced system depending on the network load.

The methods of the present invention, as described using the various embodiments here, do not call for any modification to the existing legacy system or to the legacy zone of the enhanced system, in order to be practiced or implemented.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for handover of a multimode mobile station, the method comprising:
    performing, by the multimode mobile station, a handover from a legacy base station to a legacy zone of an advanced base station (ABS); and
    performing, by the multimode mobile station, a zone switch for switching from the legacy zone of the ABS to an advanced zone of the ABS,
    wherein performing the zone switch comprises:
        transmitting, by the multimode mobile station, a ranging request message including MAC version information indicating a capability of the multimode mobile station, to the ABS; and
        receiving, by the multimode mobile station, a ranging response message including zone switch information indicating the zone switch to the advanced zone of the ABS from the legacy zone of the ABS, from the ABS.

2. The method of claim 1, wherein transmitting, by the multimode mobile station, the ranging request message to the ABS comprises transmitting the ranging request message by setting a ranging purpose indicator in the ranging request message to a zone switch request.

3. The method of claim 1, wherein the ABS is configured to detect the capability of the multimode mobile station based on the MAC version information of the multimode mobile station, wherein the capability of the multimode mobile station is to support the advanced zone.

4. The method of claim 3, wherein the ABS is configured to detect the capability of the multimode mobile station by using the MAC version information of the multimode mobile station received from one of:
    the legacy base station, wherein the MAC version information of the multimode mobile station is received over a backhaul network, and
    the multimode mobile station, wherein the MAC version information of the multimode mobile station is received through a signaling message from the multimode mobile station.

5. The method of claim 3, wherein performing the zone switch further comprises switching, by the multimode mobile station, to the advanced zone of the ABS from the legacy zone of the ABS using at least one parameter for switching in zone switch information, wherein the at least one parameter comprises at least one of a frame offset and a preamble information.

6. The method of claim 1, further comprising:
    scanning, by the multimode mobile station, a plurality of base stations from a list of neighbouring base stations, wherein the plurality of base stations includes the ABS.

7. The method of claim 6, wherein scanning, by the multimode mobile station, the plurality of base stations from the list of neighbouring base stations comprises:
    receiving, by the multimode mobile station, the list of neighbouring base stations from the legacy base station through a neighbour advertisement message.

8. The method of claim 6, wherein performing, by the multimode mobile station, the handover into the legacy zone of the ABS comprises:
    transmitting, by the multimode mobile station, a handover request message to the legacy base station;
    receiving a handover response message to the handover request message from the legacy base station, wherein the handover response message includes at least one parameter for ranging in the advanced zone of the ABS based on the capability of the multimode mobile station; and
    synchronizing, by the multimode mobile station, to the legacy zone of the ABS.

9. The method of claim 8, wherein synchronizing, by the multimode mobile station, to the legacy zone of the ABS comprises:
    obtaining, by the multimode mobile station, one or more downlink and uplink parameters of the legacy zone through a broadcast message from the legacy zone of the ABS.

10. The method of claim 6, further comprising detecting, by the multimode mobile station, a capability of the ABS by using MAC version information of the ABS, which comprises:
receiving, by the multimode mobile station, the MAC version information of the ABS through a broadcast message from one of the legacy zone of the ABS and the legacy base station, wherein the MAC version information of the ABS indicates the capability of the ABS.

11. The method of claim 6, further comprising detecting, by the multimode mobile station, a capability of the ABS by using an indicator for indicating the presence of the advanced zone, which comprises:
receiving, by the multimode mobile station, the indicator from the legacy zone of the ABS through a downlink parameter broadcast in Frame Control Header (FCH).

12. The method of claim 1, wherein the zone switch information includes at least one preamble information of the advanced zone and a frame offset between the legacy zone and the advanced zone.

13. The method of claim 1, further comprising:
performing network entry in the advanced zone of the ABS by performing a synchronization with the advanced zone of the ABS, using the zone switch information.

14. The method of claim 1, further comprising:
receiving a neighbour advertisement message from the legacy base station; and
scanning, by the multimode mobile station, a plurality of neighbor base stations including the ABS based on the neighbour advertisement message.

15. The method of claim 1, further comprising:
detecting, by the multimode mobile station, a capability of the ABS indicating that the ABS supports the advanced zone,
wherein detecting the capability of the ABS indicating that the ABS supports the advanced zone comprises detecting the capability of the ABS indicating that the ABS supports the advanced zone by using one of MAC version information of the ABS and indication information for indicating a presence of the advanced zone.

16. The method of claim 15, wherein detecting, by the multimode mobile station, the capability of the ABS by using the MAC version information of the ABS comprises receiving, by the multimode mobile station, the MAC version information of the ABS through a broadcast message from one of the legacy zone of the ABS and the legacy base station.

17. The method of claim 15, wherein detecting, by the multimode mobile station, the capability of the ABS by using the MAC version information of the ABS further comprises receiving, by the multimode mobile station, the MAC version information of the ABS through an overhead message from the legacy zone of the ABS.

18. The method of claim 15, wherein detecting, by the multimode mobile station, the capability of the ABS by using the MAC version information of the ABS further comprises receiving, by the multimode mobile station, the MAC version information of the ABS through a neighbour advertisement message from one of the legacy zone of the ABS and the legacy base station.

19. The method of claim 15, wherein detecting, by the multimode mobile station, the capability of the ABS by using the indication information for indicating the presence of the advanced zone further comprises receiving, by the multimode mobile station, the indication information from the legacy zone of the ABS through a downlink parameter broadcast in Frame Control Header (FCH).

20. The method of claim 15, further comprising:
switching, by the multimode mobile station, to the advanced zone of the ABS from the legacy zone of the ABS based on the ranging response message received from the ABS.

21. The method of claim 15, wherein the ranging response message comprises at least one parameter for switching, wherein the at least one parameter for switching comprises at least one of a frame offset and a preamble information, and wherein switching, by the multimode mobile station, to the advanced zone of the ABS from the legacy zone of the ABS comprises switching to the advanced zone of the ABS by using the at least one parameter.

22. A method for handover of a multimode mobile station, comprising:
receiving, by an advanced base station (ABS) comprising a legacy zone and an advanced zone, a ranging request message including MAC version information indicating a capability of the multimode mobile station, from the multimode mobile station; and
transmitting, by the ABS, a ranging response message including zone switch information indicating a zone switch to the advanced zone of the ABS from the legacy zone of the ABS, to the multimode mobile station.

23. The method of claim 22, wherein the zone switch information includes at least one preamble information of the advanced zone and a frame offset between the legacy zone and the advanced zone.

24. The method of claim 22, further comprising:
performing network entry in the advanced zone of the ABS by performing a synchronization with the advanced zone of the ABS, using the zone switch information.

25. The method of claim 22, further comprising:
determining whether the capability of the multimode mobile station is to support the advanced zone; and
if the multimode mobile station supports the advanced zone, generating the ranging response message including the zone switch information.

26. The method of claim 22, further comprising:
transmitting MAC version information of the ABS indicating a capability of the ABS to the multimode mobile station,
wherein the capability of the ABS indicates that the ABS supports the advanced zone.

27. The method of claim 22, wherein the ranging request message includes a ranging purpose indicator set to a zone switch request.

28. The method of claim 22, wherein the ranging response message comprises at least one parameter for switching, and wherein the at least one parameter for switching comprises at least one of a frame offset and a preamble information.

29. An apparatus of a multimode mobile station, comprising:
one or more processors configured to perform a handover from a legacy base station to a legacy zone of an advanced base station (ABS), and perform a zone switch for switching from the legacy zone of the ABS to an advanced zone of the ABS; and
a transceiver,
wherein the one or more processors are configured to transmit a ranging request message including MAC version information indicating a capability of the multimode mobile station, to the ABS, and
wherein the transceiver is configured to receive a ranging response message including zone switch information indicating the zone switch to the advanced zone of the ABS from the legacy zone of the ABS, from the ABS.

30. The apparatus of claim 29, wherein the one or more processors are further configured to detect a capability of the ABS indicating that the ABS supports the advanced zone by detecting the capability of the ABS indicating that the ABS supports the advanced zone by using one of MAC version information of the ABS or indication information for indicating a presence of the advanced zone.

31. The apparatus of claim 30, wherein the transceiver is configured to receive the MAC version information of the ABS through a broadcast message from one of the legacy zone of the ABS and the legacy base station.

32. The apparatus of claim 30, wherein the transceiver is configured to receive the MAC version information of the ABS through an overhead message from the legacy zone of the ABS.

33. The apparatus of claim 30, wherein the transceiver is configured to receive the MAC version information of the ABS through a neighbour advertisement message from one of the legacy zone of the ABS and the legacy base station.

34. The apparatus of claim 30, wherein the transceiver is configured to receive the indication information from the legacy zone of the ABS through a downlink parameter broadcast in Frame Control Header (FCH).

35. The apparatus of claim 29, wherein the transceiver is configured to transmit the ranging request message by setting a ranging purpose indicator in the ranging request message to a zone switch request.

36. The apparatus of claim 30, wherein the one or more processors are configured to switch to the advanced zone of the ABS from the legacy zone of the ABS based on the ranging response message received from the ABS.

37. The apparatus of claim 36, wherein the ranging response message comprises at least one parameter for switching, wherein the at least one parameter for switching comprises at least one of a frame offset and a preamble information, and wherein the one or more processors are configured to perform the zone switch for switching, by the multimode mobile station, to the advanced zone of the ABS from the legacy zone of the ABS using the at least one parameter.

38. The apparatus of claim 29, wherein the ABS is configured to detect the capability of the multimode mobile station based on the MAC version information of the multimode mobile station, wherein the capability of the multimode mobile station is to support the advanced zone.

39. The apparatus of claim 38, wherein the ABS is configured to detect the capability of the multimode mobile station by using the MAC version information of the multimode mobile station received from one of:
the legacy base station, wherein the MAC version information of the multimode mobile station is received over a backhaul network, and
the multimode mobile station, wherein the MAC version information of the multimode mobile station is received through a signaling message from the multimode mobile station.

40. The apparatus of claim 38, wherein the one or more processors are configured to switch to the advanced zone of the ABS from the legacy zone of the ABS using at least one parameter for switching in the zone switch information, wherein the at least one parameter comprises at least one of a frame offset and a preamble information.

41. The apparatus of claim 29, wherein the one or more processors are further configured to scan a plurality of base stations from a list of neighbouring base stations, wherein the plurality of base stations includes the ABS.

42. The apparatus of claim 41, wherein the transceiver is configured to receive the list of neighbouring base stations from the legacy base station through a neighbour advertisement message.

43. The apparatus of claim 41, wherein the one or more processors are configured to perform the handover into the legacy zone of the ABS by:
transmitting a handover request message to the legacy base station;
receiving a handover response message to the handover request message from the legacy base station, wherein the handover response message includes at least one parameter for ranging in the advanced zone of the ABS based on the capability of the multimode mobile station; and
synchronizing to the legacy zone of the ABS.

44. The apparatus of claim 43, wherein the one or more processors are configured to synchronize to the legacy zone of the ABS by obtaining, by the multimode mobile station, one or more downlink and uplink parameters of the legacy zone through a broadcast message from the legacy zone of the ABS.

45. The apparatus of claim 41, wherein the transceiver is configured to receive a MAC version of the ABS through a broadcast message from one of the legacy zone of the ABS and the legacy base station, wherein the MAC version of the ABS indicates a capability of the ABS.

46. The apparatus of claim 29, wherein the zone switch information includes at least one preamble information of the advanced zone and a frame offset between the legacy zone and the advanced zone.

47. The apparatus of claim 29, wherein the one or more processors are further configured to perform network entry in the advanced zone of the ABS by performing a synchronization with the advanced zone of the ABS, using the zone switch information.

48. The apparatus of claim 29, wherein the one or more processors are further configured to control the transceiver to receive a neighbour advertisement message from the legacy base station; and scan a plurality of neighbour base stations including the ABS based on the neighbour advertisement message.

49. An apparatus for handover of a multimode mobile station in an advanced base station (ABS) comprising a legacy zone and an advanced zone, comprising:
a transceiver configured to:
receive a ranging request message including MAC version information indicating a capability of the multimode mobile station, from the multimode mobile station; and
transmit a ranging response message including zone switch information indicating a zone switch to the advanced zone of the ABS from the legacy zone of the ABS, to the multimode mobile station.

50. The apparatus of claim 49, wherein the zone switch information includes at least one preamble information of the advanced zone and a frame offset between the legacy zone and the advanced zone.

51. The apparatus of claim 49, further comprising:
one or more processors configured to perform network entry in the advanced zone of the ABS by performing a synchronization with the advanced zone of the ABS, using the zone switch information.

52. The apparatus of claim 49, further comprising:
one or more processors configured to determine whether the capability of the multimode mobile station is to support the advanced zone; and if the multimode mobile station supports the advanced zone, generate the ranging response message including the zone switch information.

53. The apparatus of claim 49, wherein:

the transceiver is further configured to transmit MAC version information of the ABS indicating a capability of the ABS to the multimode mobile station, and the capability of the ABS indicates that the ABS supports the advanced zone.

54. The apparatus of claim 49, wherein the ranging request message includes a ranging purpose indicator set to a zone switch request.

55. The apparatus of claim 49, wherein:

the ranging response message comprises at least one parameter for switching; and the at least one parameter for switching comprises at least one of a frame offset and preamble information.

* * * * *